April 20, 1965   A. E. HARTMAN   3,178,995
DRIFT-COMPENSATING CIRCUIT FOR D.C. AMPLIFIERS
Filed April 25, 1961
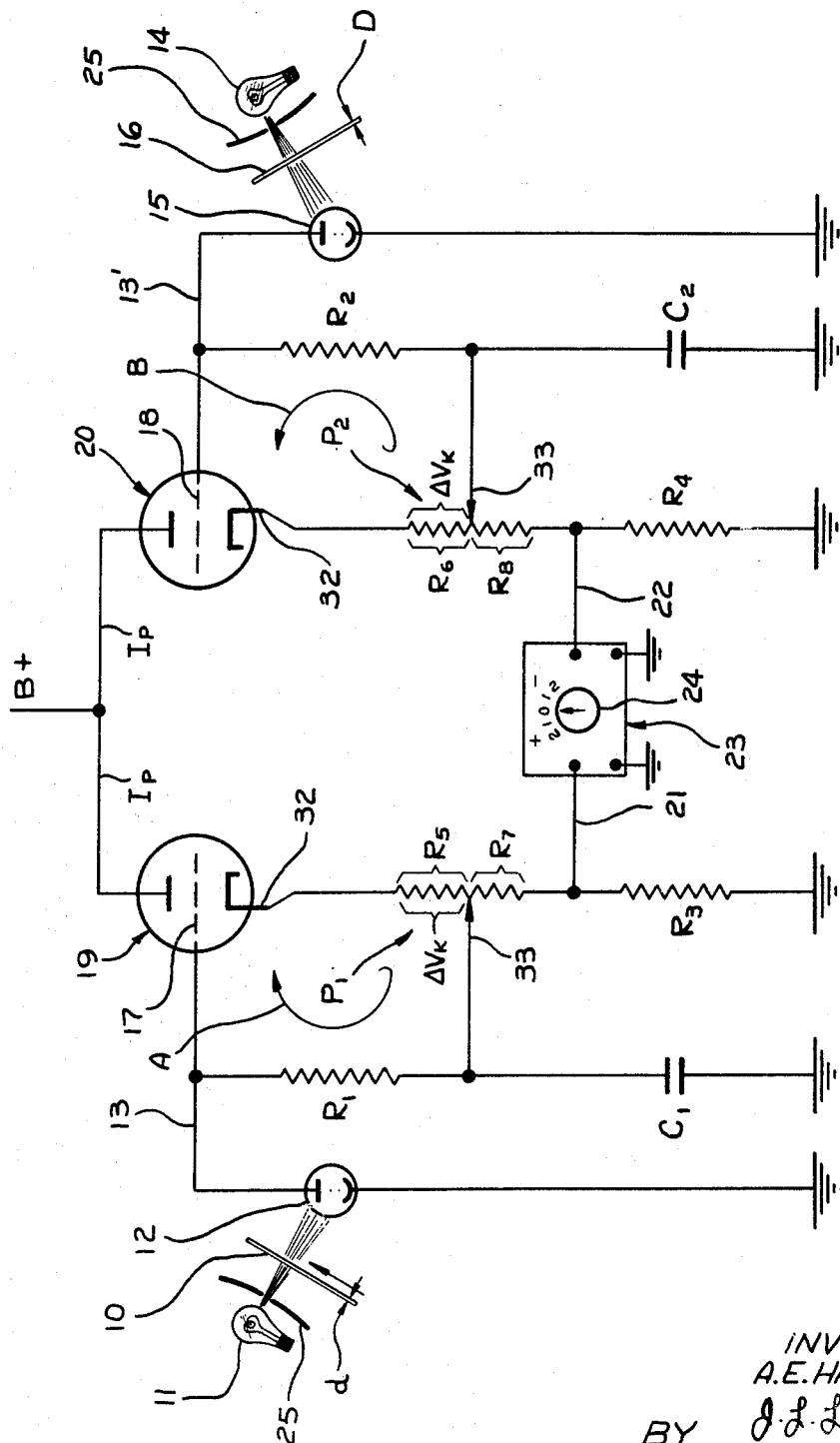
INVENTOR
A.E. HARTMAN
BY J.L. Landis
ATTORNEY

3,178,995
DRIFT-COMPENSATING CIRCUIT FOR D.C. AMPLIFIERS
Alfred E. Hartman, Ralston, Nebr., assignor to Western Electric Company, Incorporated, New York, N.Y., a corporation of New York
Filed Apr. 25, 1961, Ser. No. 105,448
4 Claims. (Cl. 88—14)

The present invention relates generally to drift-compensating circuits for D.C. amplifiers, and more particularly to circuits designed to compensate for the tube drift in a pair of nominally identical, cathode-following D.C. amplifier tubes used in comparator circuits. Accordingly, the general objects of the invention are to provide new and improved drift-compensating circuits of such character.

The invention is especially useful in comparator circuits of the type wherein two positive and independent reference potentials representative of a process condition are impressed upon corresponding grids of a pair of nominally identical, conventional cathode-following D.C. amplifier tubes having cathode, anode and grid elements, and wherein the tube outputs are balanced through a comparison device which detects deviations in the process condition. Even though such amplifier tubes are customarily made as nearly alike as possible, the emission characteristics vary between the two tubes due to aging, heating effects, and other causes; whereby, in a relatively short period of time, readings appear on the comparison device which are based on tube drift and not on variation in the process condition under study.

Another object of the invention is to provide new and improved compensating circuits for such comparator systems, whereby each amplifier tube is individually compensated for the tube drift so that the output on the comparison device reflects only deviations in the process condition and not spurious effects caused by relative variations in the emission characteristics of the two amplifier tubes.

Such comparator circuits have been used in photoelectric diameter gages for advancing insulated wire, wherein a first beam of light is passed between a wire under test and a first photocell and wherein a second beam of light is passed between a standard wire of nominal diameter and a second photocell. The photocell outputs are too weak to be of practical value and are accordingly impressed upon the control grids of a pair of nominally identical, cathode-following D.C. amplifiers in a balanced circuit. Previous to the adoption of the subject compensating circuit, the tube manufacturers had been unable to guarantee the drift-characteristics of the nominally identical pairs of tubes to hold within plus or minus 0.5 mil of wire diameter due to drift over a four hour period, which is too large a drift to be tolerated in the insulated wire industry. However, with the advent of the subject compensating circuit, the drift effect has been consistently held to below plus or minus 0.2 mil error over several days, which has made practical the use of such photoelectric diameter gages in the manufacture of insulated wire.

With the foregoing and other objects in view, a drift-compensating circuit embodying certain aspects of the invention may include a potentiometer arrangement in the cathode circuit of a conventional D.C. amplifier tube and designed to feed back to the grid a control potential of such polarity and magnitude as to counteract the effect of internal tube drift caused by variation in the emission characteristics of the tube.

Preferably, the compensating circuit is used in conjunction with a comparator circuit including a pair of nominally identical, cathode-following D.C. amplifier tubes wherein the tube outputs are balanced through a comparison device to detect deviations in a process condition. In this environment, there are provided two individual and isolated potentiometers arranged one in each cathode circuit, each potentiometer having a variable tap connected in circuit with a corresponding grid through a resistor to provide a feedback loop from the cathode to the grid. The potentiometer and resistor pairs have resistance values such that a control potential which is set up in the corresponding feedback loop is of such polarity and magnitude as to counteract the effect of internal tube drift so that the comparison device detects only deviations in the process condition. The potentiometers are initially balanced one against the other so that the tube outputs are equal when equal reference potentials are impressed upon the grids.

Other objects, advantages and aspects of the invention will appear from the following detailed description of a specific embodiment thereof, when taken in conjunction with the appended drawing, in which the single figure is a schematic illustration of a photoelectric diameter comparator having drift-compensating circuits in accordance with the principles of the present invention.

Referring now in detail to the drawing, there is illustrated a photoelectric diameter comparator in accordance with one specific embodiment of the invention. An insulated wire 10 to be gaged is passed between a light source 11 and a photocell 12, the output 13 from which is a function of the wire diameter $d$. For comparison purposes, a similar light source 14 and photocell 15 are used with a wire 16 of nominal diameter D, the diameter at which it is desired to maintain the wire 10. The output 13' from the photocell 15 is constant and represents the nominal diameter.

The photocell outputs 13 and 13' are too small to be of practical value; wherefore, these outputs are respectively impressed upon the grids 17 and 18 of a pair of nominally identical, conventional cathode-following D.C. amplifier tubes 19 and 20. The outputs 21 and 22 from the tubes 19 and 20 are initially balanced through a conventional comparison device 23 including a meter 24 (or other similar null-indicating, recording or controlling device) which indicates deviation of the wire diameter $d$ in mils plus or minus when the photocell output 13 varies. In one specific example, the comparison device 23 includes a pair of A.C. operated cathode followers to modulate the outputs 21 and 22, a transformer to set the phase relationship, a conventional R-C amplifier, a detector circuit, a pair of R-C coupled cathode followers, and the meter 24 which is a D.C. millivoltmeter calibrated in terms of diameter deviation in mils.

Components $R_1$, $C_1$ and $R_2$, $C_2$ are conventional, and function both to cut off external signals to ground and to establish a time constant which sets how fast the circuits respond to changes. A pair of load resistors $R_3$ and $R_4$ set the operating levels of the tubes 19 and 20; that is, they govern steady-state current passing through each tube without a signal on the grid. At the start of each run, a standard wire similar to the wire 16 is placed between the light source 11 and the photocell 12, and a micrometric device (not shown) is utilized to adjust the aperture of either or both of a pair of light shields 25—25, which are interposed between the light sources 11 and 14 and the photocells 12 and 15, until the system is in balance. Other initial balancing methods could be used equally well.

The outputs 21 and 22 from the tubes 19 and 20 are governed by the voltage between the cathode and grid; however, even though the tubes 19 and 20 are as nearly identical as may be obtained, they are subject to "drift" over a relatively short period of time, by which is meant primarily a change in the emission characteristics which alters the tube outputs. The word "drift" also includes any other variation in the tube outputs not caused by variation in the input signal. The drift characteristics of two tubes are substantially never identical, so that after a time spurious readings appear on the meter 24 which are caused by unequal drift in the amplifier tubes 19 and 20 and not by diameter variation.

The subject drift-compensating circuit is especially useful in conjunction with such a photoelectric diameter comparator, and includes two individual and isolated potentiometers $P_1$ and $P_2$ arranged one in each cathode circuit between the corresponding output 21 or 22 and the cathode 32. A variable tap 33 of each potentiometer is connected in circuit with the corresponding grid 17 or 18 through the corresponding input resistors $R_1$ or $R_2$ to provide a feed-back loop from the cathode 32 to the grid 17 or 18 through a portion $R_5$ or $R_6$ of the resistance of the potentiometers $P_1$ and $P_2$. Each potentiometer and resistor pair $P_1$-$R_1$ and $P_2$-$R_2$ have resistance values set such that the control potential which is set up in each corresponding feed-back loop (arrows A and B) is of such polarity and magnitude as to counteract the effect of internal tube drift caused by variation in the emission characteristics of the corresponding tube 19 or 20.

*Example*

In one specific example of a diameter comparator circuit as illustrated in the drawing the photocell outputs 13 and 13' are in the range of 200–300 millivolts D.C. with a current in the micro-microampere range; the tubes 19 and 20 are conventional 6SN7 tubes; the capacitors $C_1$ and $C_2$ are 0.01 microfarad, a relatively low reactance such as may be practically disregarded in circuit calculations; and the load resistors $R_3$ and $R_4$ are fixed as a practical matter by the foregoing parameters to set the desired operating level for the tubes 19 and 20. The resistors $R_3$ and $R_4$ are 560,000 ohm resistors in the specific example, and the resultant amplifier outputs 21 and 22 are of the order of 0.2 milliampere at a potential of about 95% of the input potential.

With the foregoing factors dictated in any given application of the invention, the input resistors $R_1$ and $R_2$ are set at values many times those of $R_3$ and $R_4$ so that the feedback voltages through the potentiometer-resistor couples $P_1$-$R_1$ and $P_2$-$R_2$ are minute, of the order of a few millivolts as compared to the photocell outputs 13 and 13' of 200–300 millivolts so as to shift the grid bias slightly for the purposes of the invention. While the ratio of $R_1$ to $R_3$ (and also $R_2$ to $R_4$) may be varied somewhat in individual applications, a highly effective ratio to achieve the object of the invention is of the order of 10:1; thus, the value of each of the resistors $R_1$ and $R_2$ in the specific example is 5.6 megohms.

In order to produce the desired feed-back signal to compensate for drift, the resistance $R_5$ or $R_6$ of the potentiometers $P_1$ and $P_2$ between the cathode 32 and the tap 33, must be very low relative to the load resistors $R_3$ and $R_4$, preferably of the order 1:50. In the specific example, $R_5$ and $R_6$ are adjustable and are conveniently set at approximately 10,000 ohms, or about 1.8% of $R_3$ and $R_4$. The resistance $R_7$ and $R_8$ provided by the remainder of the potentiometers $P_1$ and $P_2$, that between each tap 33 and the output 21 or 22, is insignificant relative to the load resistors $R_3$ and $R_4$, and in the specific example $R_7$ and $R_8$ equal 2,000 ohms when $R_5$ and $R_6$ are 10,000 ohms.

*Operation*

As a convenient example of the operation of the invention, and assuming an initial state where the circuit has been balanced for some time and the wire 10 is of the nominal diameter D, the photocell outputs 13 and 13' are both equal to +220 millivolts. Considering the left half of the circuit, the tube 19 is in a balanced, quiescent state where the plate current I$p$ is 0.1 milliampere in the specific example. Thus, the voltage drop $\Delta V_k$ across the resistance $R_5$ is —1.0 volt in this case. The voltage drop across $R_1$ is $$10/11\left[\frac{R_1}{R_1+R_3}\right] \times 220 \text{ millivolts}$$

or +0.2 volt. The grid bias is thus equal to —0.8 volt (—1.0 volt +0.2 volt) in the specific example of steady-state operation. The resultant voltage drop across $R_3$ (the output 21) is thus 56.0 volts based on the plate current of 0.1 milliampere and a resistor $R_3$ of 560,000 ohms. The capacitor $C_1$ is charged to a steady-state value of approximately 56 volts by the load resistor $R_3$. The right half of the circuit is similarly balanced to the same potentials, whereby no output appears on the meter 24.

Assuming now that the wire diameter decreases to a value well below the nominal diameter D such that the photocell output increases to 330 millivolts, then +0.3 volt appears across $R_1$ and the negative grid bias decreases to —0.7 volt since the voltage drop $\Delta V_k$ across the resistance $R_5$ remains constant at —1.0 volt within measurable limits. This decrease in the negative grid bias voltage causes the plate current I$p$ to increase such that approximately 56.1 volts appear across $R_3$ and a negative unbalance appears on the meter 24. The circuit is now in a stable unbalanced condition and will remain so until a further change occurs in the wire diameter $d$. The opposite effect occurs when the wire diameter increases; that is, the photocell output, the voltage drops across $R_1$ and $R_3$, and the plate current I$p$ all decrease correspondingly to provide a positive (or less negative) unbalance to the meter 24.

Considering again the initial steady-state condition based on the diameter $d$ being equal to the nominal diameter D and with a photocell output of 220 millivolts, the manner in which the subject invention compensates for tube drift will now be described. Assuming that the emission characteristics of the tube 19 changes to permit more current flow through $R_3$ and $R_5$ such that the absolute value of $\Delta V_k$ increases to —1.01 volts, the negative grid bias accordingly increases to —0.81 volt based on +0.2 volt across $R_1$ in the specific example given above. This increase in negative grid bias restores the plate current to the original value in accordance with the principles of the invention. Conversely, if the plate current I$p$ decreases due to tube drift, the absolute value of $\Delta V_k$ will decrease, which will decrease the negative grid bias and thus restore the plate current to the original value.

In view of the foregoing description of one specific example of a preferred commercial application of the invention, it will be apparent that a simple, inexpensive and highly reliable drift-compensating circuit has been provided for D.C. amplifier tubes, and more particularly for a common type of comparator circuit featuring a pair of nominally identical, cathode-following D.C. amplification circuits. It is also apparent that various modifications may be made from the specific details described in conjunction with the specific example without departing from the spirit and scope of the invention.

What is claimed is:
1. A drift-compensating circuit for a cathode-following D.C. amplifier circuit of the type wherein a positive reference potential is impressed upon the control grid of a conventional cathode-following D.C. amplifier tube having cathode, anode and grid elements, the amplifier circuit including a load resistor setting the output level of the tube and including an output connection between the cathode and the load resistor:

said drift-compensating circuit comprising a potentiometer for providing resistance in the cathode circuit between the cathode and the load resistor, said potentiometer having a variable tap connected in circuit with the grid to provide a feed-back loop from the cathode to the grid through a portion of the resistance of said potentiometer; and a resistor in the feed-back loop between the potentiometer tap and the connection in the grid circuit, said resistor having an ohmic value of the order of ten times that of the load resistor, the resistance portion of said potentiometer between the cathode and the varible tap being of the order of one-fiftieth that of the load resistor, and the ohmic value of the resistance of the remainder of said potentiometer being substantially insignificant relative to that of the load resistor.

2. A drift-compensating circuit for a cathode-following D.C. amplifier circuit of the type wherein a positive reference potential is impressed upon the control grid of a conventional cathode-following D.C. amplifier tube having cathode, anode and grid elements, the amplifier circuit including a load resistor setting the output level of the tube and including an output connection between the cathode and the load resistor:

said drift-compensating circuit comprising a first resistance in the cathode circuit between the cathode and the load resistor; a feed-back loop from the cathode to the grid through said first resistance; and a second resistance in said feed-back loop between said first resistance and the grid, said second resistance having an ohmic value of the order of ten times that of the load resistor, and said first resistance having an ohmic value of the order of one-fiftieth that of load resistor.

3. A drift compensating circuit for a comparator circuit of the type wherein two positive and independent reference potentials representative of a process condition are impressed upon respective grids of a pair of nominally identical, conventional cathode following D.C. amplifier tubes having cathode, anode and grid elements, wherein the tube outputs are balanced through a comparison device to detect deviations in the process condition, and wherein each amplifier tube circuit includes a load resistor setting the output level of the tube and includes an output connection between its cathode and the load resistor:

said drift compensating circuit comprising two individual and isolated first resistances arranged one in each amplifier tube circuit between its cathode and the load resistor in the circuit; a feed-back loop from the cathode of each tube to the grid of the tube through its respective first resistance; and a pair of second resistances, one in each feed-back loop between said first resistance in said loop and the respective grid, each of said second resistances having an ohmic value of the order of ten times that of its respective load resistor, and each of said first resistances having an ohmic value of the order of one-fiftieth that of its respective load resistor.

4. Apparatus for measuring deviations in the diameter of an advancing insulated wire, which comprises a standard wire having a diameter equal to a nominal diameter for the wire to be tested; a pair of balanced sensing units each including a photocell, the wire to be tested being arranged to pass between an associated light source and the photocell of one sensing unit and the standard wire being interposed between an associated light source and the photocell of the other unit, each photocell producing a positive and independent reference potential which varies in accordance with the diameter of the corresponding wire; a pair of nominally identical cathode-following amplifier tubes having cathode, anode and grid elements, each photocell output being impressed upon the grid of an associated one of said amplifier tubes; a comparison device for comparing the amplifier outputs to detect deviations in the diameter of the wire under test; a pair of first resistances arranged one in the cathode circuit of each amplifier tube for setting the operating levels of said amplifier tubes; two individual and isolated second resistances arranged one in each cathode circuit between the cathode and said first resistance in the circuit; a feed-back loop from each cathode to its respective grid through the respective one of said second resistances; and a pair of third resistances, one in each feed-back loop between said second resistance in said loop and the respective grid; each of said third resistances having an ohmic value of the order of ten times that of its respective first resistance and each of said second resistances having an ohmic value of the order of one-fiftieth that of its respective first resistance, such that a control potential which is set up in each of said feed-back loops is of such polarity and magnitude as to counteract the effect of internal tube drift caused by variation in the emission characteristics of the respective tube, said second resistances being initially balanced one against the other so that the tube outputs are equal when equal reference potentials are impressed upon the grids.

References Cited by the Examiner
UNITED STATES PATENTS

| 2,510,347 | 6/50 | Perkins | 88—14 |
| 2,517,330 | 8/50 | Marenholtz | 88—14 |
| 2,583,737 | 1/52 | Hoffman et al. | 330—173 |
| 2,796,469 | 6/57 | Papouschek | 330—96 |

JEWELL H. PEDERSEN, *Primary Examiner.*

EMIL G. ANDERSON, *Examiner.*